United States Patent
Hirai

(10) Patent No.: US 9,922,402 B2
(45) Date of Patent: Mar. 20, 2018

(54) INFORMATION PRESENTATION DEVICE

(71) Applicant: MITSUBISHI ELECTRIC CORPORATION, Tokyo (JP)

(72) Inventor: Masato Hirai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 272 days.

(21) Appl. No.: 14/771,247

(22) PCT Filed: Jul. 9, 2013

(86) PCT No.: PCT/JP2013/068708
§ 371 (c)(1),
(2) Date: Aug. 28, 2015

(87) PCT Pub. No.: WO2015/004725
PCT Pub. Date: Jan. 15, 2015

(65) Prior Publication Data
US 2016/0078603 A1    Mar. 17, 2016

(51) Int. Cl.
*G09G 5/00* (2006.01)
*G06T 5/00* (2006.01)
*G09G 5/28* (2006.01)
*G01C 21/36* (2006.01)
*B60K 35/00* (2006.01)

(52) U.S. Cl.
CPC .............. *G06T 5/002* (2013.01); *B60K 35/00* (2013.01); *G01C 21/3626* (2013.01); *G09G 5/28* (2013.01); *G06K 2209/01* (2013.01); *G06K 2209/011* (2013.01)

(58) Field of Classification Search
None
See application file for complete search history.

(56) References Cited

U.S. PATENT DOCUMENTS

| | | |
|---|---|---|
| 2005/0055154 A1 | 3/2005 | Tanaka et al. |
| 2006/0256094 A1 | 11/2006 | Inagaki |
| 2008/0055654 A1 | 3/2008 | Tamura |
| 2010/0030424 A1 | 2/2010 | Kitagawa |

FOREIGN PATENT DOCUMENTS

| | | |
|---|---|---|
| JP | 2005-37375 A | 2/2005 |
| JP | 2005-75314 A | 3/2005 |
| JP | 2005-331501 A | 12/2005 |
| JP | 2006-315597 A | 11/2006 |
| JP | 2008-61136 A | 3/2008 |
| JP | 2008-102332 A | 5/2008 |
| JP | 2010-33459 A | 2/2010 |
| JP | 2012-154749 A | 8/2012 |
| JP | 2012-208794 A | 10/2012 |

*Primary Examiner* — Ryan R Yang
(74) *Attorney, Agent, or Firm* — Birch, Stewart, Kolasch & Birch, LLP

(57) ABSTRACT

A character attribute determination section 1 determines a attribute of a character on the basis of a character attribute database 2. A blur intensity decision section 5 acquires a blur intensity for each character attribute on the basis of legibility control knowledge 3, and decides the blur intensity for the target character corresponding to the character attribute determined by the character attribute determination section 1. A blurring process execution section 6 performs a blurring process to the character with the blur intensity decided by the blur intensity decision section 5.

6 Claims, 13 Drawing Sheets

FIG.3

| Character | Character Attribute |||
|---|---|---|---|
| | Character Type | Number of Strokes | Character Density |
| あ | Hiragana | 3 | 40 |
| い | Hiragana | 2 | 20 |
| ｜ | | | |
| ア | Katakana | 2 | 30 |
| イ | Katakana | 2 | 20 |
| ｜ | | | |
| A | Alphabet | 2 | 30 |
| B | Alphabet | 2 | 30 |
| ｜ | | | |
| 1 | Numeral | 1 | 10 |
| 2 | Numeral | 1 | 20 |
| ｜ | | | |
| 亜 | Kanji | 7 | 60 |
| 胃 | Kanji | 9 | 80 |
| ｜ | | | |

FIG.4

| Character | Character Attribute | | |
|---|---|---|---|
| | Character Type | Number of Strokes | Character Density |
| 横 | Kanji | 15 | 80 |
| 浜 | Kanji | 9 | 60 |
| こ | Hiragana | 2 | 20 |
| ど | Hiragana | 4 | 40 |
| も | Hiragana | 3 | 30 |
| セ | Katakana | 3 | 20 |
| ン | Katakana | 2 | 20 |
| タ | Katakana | 3 | 30 |
| ー | Katakana | 1 | 10 |
| K | Alphabet | 3 | 20 |
| I | Alphabet | 1 | 10 |
| D | Alphabet | 2 | 20 |
| S | Alphabet | 1 | 20 |
| 3 | Numeral | 1 | 20 |

| Character Type | Blur Intensity |
|---|---|
| Hiragana | High |
| Katakana | High |
| Alphabet | High |
| Numeral | High |
| Kanji | Low |

FIG.6

| Number of Strokes | Blur Intensity |
|---|---|
| 1 to 5 Strokes | High |
| 6 to 10 Strokes | Medium |
| 11 Strokes or More | Low |

FIG.7

| Character | Character Density | Blur Intensity |
|---|---|---|
| L | 0 to 20 (Low) | 5 (High) |
| 8 | 20 to 40 | 4 |
| ぼ | 40 to 60 | 3 |
| 海 | 60 to 80 | 2 |
| 鱗 | 80 to 100 (High) | 1 (Low) |

FIG.8

| Character Type | Number of Strokes | Blur Intensity |
|---|---|---|
| Hiragana | | High |
| Katakana | | High |
| Alphabet | | High |
| Numeral | | High |
| Kanji | 1 to 5 Strokes | High |
| | 6 to 10 Strokes | Medium |
| | 11 Strokes or More | Low |

FIG.9
(a)
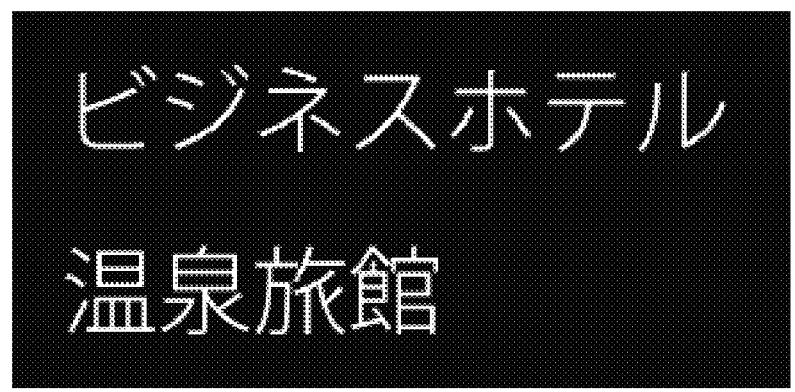
(b)
(c)

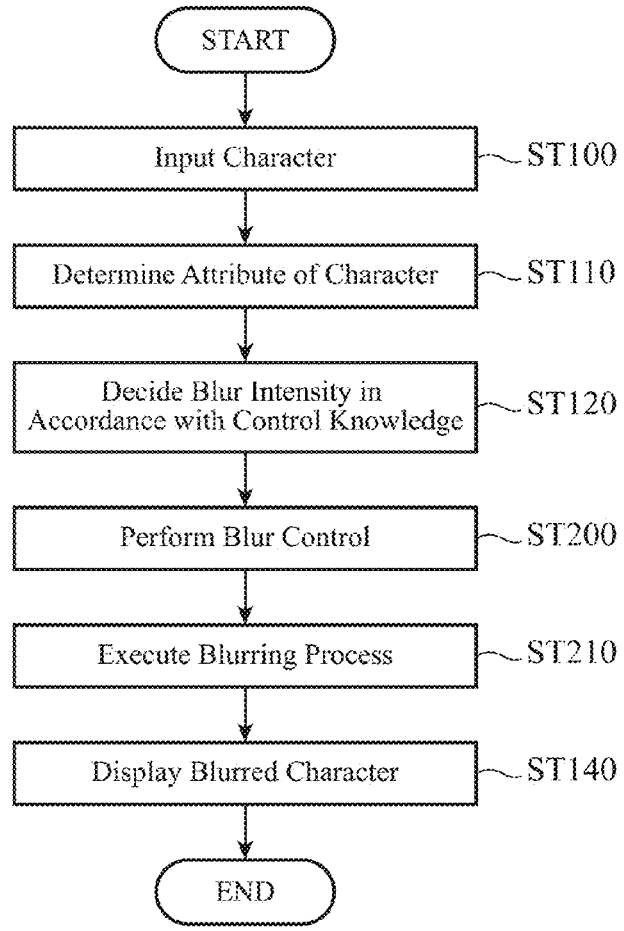

| Blur Intensity | Number of Superpositions of Blurred Character |
|---|---|
| High | 3 Times |
| Medium | Twice |
| Low | Once |

| Blur Intensity | Number of Superpositions with Displacement of Blurred Character |
|---|---|
| High | 3 Times |
| Medium | Twice |
| Low | Once |

FIG.15
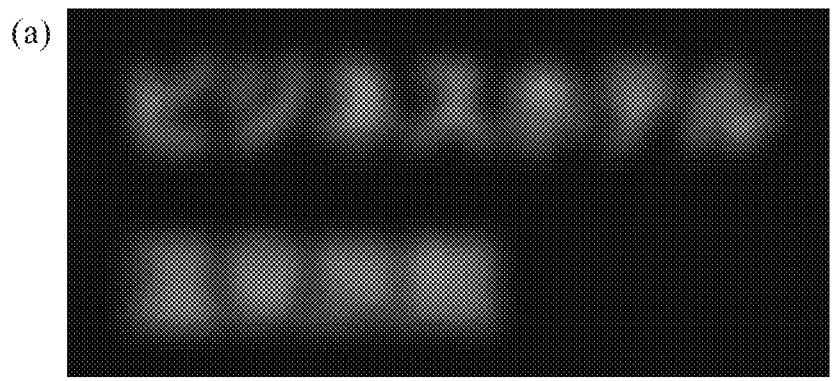
(a)
(b)
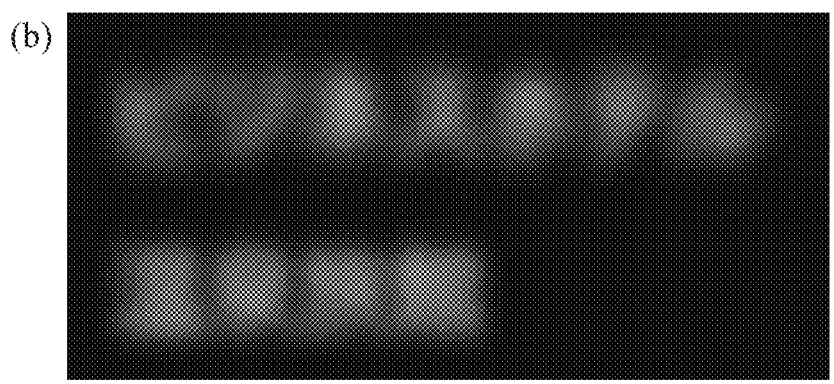
FIG.16
| Number of Strokes | Blur Intensity | Boldfacing Level |
|---|---|---|
| 1 to 5 Strokes | High | Greatly Boldfaced |
| 6 to 10 Strokes | Medium | Moderately Boldfaced |
| 11 Strokes or More | Low | Not Boldfaced |

INFORMATION PRESENTATION DEVICE

TECHNICAL FIELD

The present invention relates to an information presentation device that is mainly installed in a vehicle, and that presents information to a user of the vehicle.

BACKGROUND ART

In an information presentation device installed in a vehicle such as car navigation system, conventionally, it is adapted to reduce the amount of information of characters displayed during running in consideration of a balance between operability and safety.

For such a device, the one described in Patent Document 1, for example, is as follows: because it is dangerous for a driver to read characters during running, a "presentatable information quantity" is determined in accordance with the running state of a vehicle; when an amount of information exceeds the presentatable information quantity, presentation information with a low priority (e.g. pictures and characters) are hidden, or the characters are blurred, or part of the characters replaced with a symbol "■" is displayed.

In addition, in a device described in Patent Document 2, for the purpose of enabling a predetermined operation while ensuring the safety for a driver even when a vehicle is running, in order to shorten the time for closely viewing a list screen, the following control is performed: only a character string for an item indicated by a cursor is displayed and the other items are hidden.

CITATION LIST

Patent Document

Patent Document 1: Japanese Patent Application Laid-open No. 2005-331501
Patent Document 2: Japanese Patent Application Laid-open No. 2006-315597

SUMMARY OF THE INVENTION

Problems to be Solved by the Invention

However, as described in Patent Document 1, in the case where the characters are hidden or replaced with the symbol ■ in order to reduce the amount of information of the characters, the design of a screen is collapsed, which poses a problem such that the quality of a display screen is degraded. In addition, it becomes totally unknown what kind of characters were originally displayed, which also poses a problem to deteriorate usability. Further, in the case where the characters are simply blurred, the characters may be blurred unevenly as follows: depending on a character type (hiragana character, katakana character, alphabet, numeral, or kanji character) and a character density (the number of strokes etc.), the blurred characters are thin and faint, or blurred in a mass to thereby crush the characters. Thus, there is a problem such that the display in a blurred state lacks uniformity.

In addition, as described in Patent Document 2, in the case where only the characters for the item indicated by the cursor in the list are displayed, while the characters for the items not indicated by the cursor are hidden, the character strings for all the items can be read when the cursor is moved. Contrarily, this induces an operation for moving the cursor, which poses a problem in safety with respect to operability during driving.

The present invention is made to solve the above problems, and an object of the invention is to provide an information presentation device that can make high-quality display with a sense of uniformity and that can enhance safety during operation.

Means for Solving the Problems

An information presentation device of the present invention provides is configured to include a legibility controller that performs a blurring process to a character to be displayed on a display, wherein the legibility controller varies a blur intensity for the character in accordance with an attribute of the character.

Effect of the Invention

The information presentation device of the present invention is configured to perform the blurring process with the blur intensity corresponding to the character attribute of the character. This makes it possible to make high-quality display with a sense of uniformity, and to enhance safety during operation.

BRIEF DESCRIPTION OF THE DRAWINGS

FIG. 3 is an explanatory diagram of a character attribute database in the information presentation device of Embodiment 1 of the invention.

FIG. 4 is an explanatory diagram illustrating a character attribute determination result in the information presentation device of Embodiment 1 of the invention.

FIG. 5 is an explanatory diagram illustrating an example (legibility control knowledge 3a) of legibility control knowledge in the information presentation device of Embodiment 1 of the invention.

FIG. 6 is an explanatory diagram illustrating an example (legibility control knowledge 3b) of the legibility control knowledge in the information presentation device of Embodiment 1 of the invention.

FIG. 7 is an explanatory diagram illustrating an example (legibility control knowledge 3c) of the legibility control knowledge in the information presentation device of Embodiment 1 of the invention.

FIG. 8 is an explanatory diagram illustrating an example (legibility control knowledge 3d) of the legibility control knowledge in the information presentation device of Embodiment 1 of the invention.

FIG. 9 is an explanatory diagram illustrating a specific display example in the information presentation device of Embodiment 1 of the invention.

FIG. 11 is a flowchart illustrating an operation in the information presentation device of Embodiment 2 of the invention.

FIG. 12 is an explanatory diagram illustrating an example (blurring process control knowledge 9a) of blurring process control knowledge in the information presentation device of Embodiment 2 of the invention.

FIG. 13 is an explanatory diagram illustrating an example (blurring process control knowledge 9b) of the blurring process control knowledge in the information presentation device of Embodiment 2 of the invention.

FIG. 14 is an explanatory diagram illustrating an example (blurring process control knowledge 9c) of the blurring process control knowledge in the information presentation device of Embodiment 2 of the invention.

FIG. 15 is an explanatory diagram illustrating a specific display example in the information presentation device of Embodiment 2 of the invention.

FIG. 16 is an explanatory diagram illustrating an example of a relationship in a blurring process in the information presentation devices of Embodiments 1 and 2 of the invention.

MODES FOR CARRYING OUT THE INVENTION

In the following, in order to describe the present invention in more detail, embodiments for carrying out the invention will be described with reference to the accompanying drawings.

Embodiment 1

Figure 1:
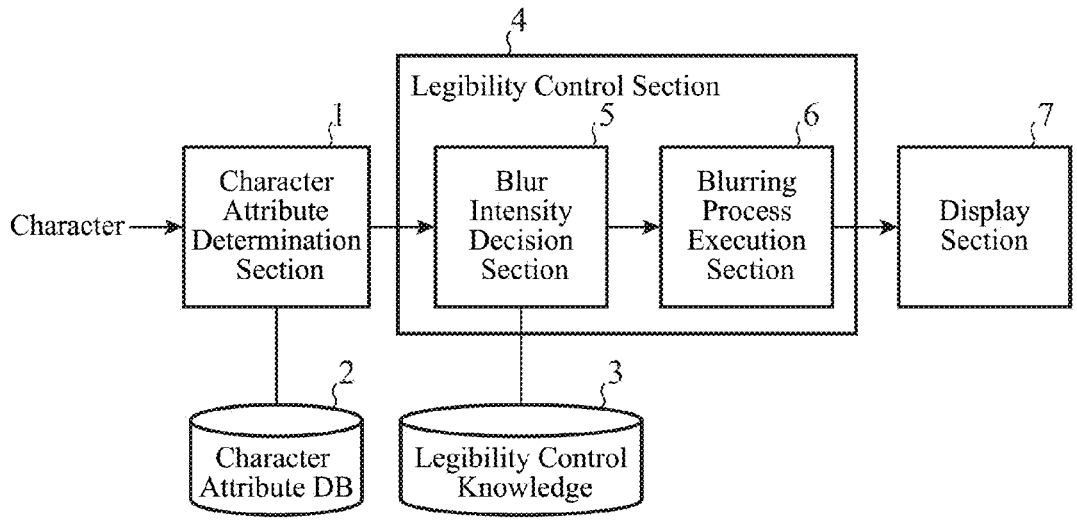
FIG. 1 is a block diagram illustrating an information presentation device of Embodiment 1 of the present invention.

FIG. 1 is a block diagram of an information presentation device according to the present embodiment.

As illustrated in the drawing, the information presentation device includes a character attribute determination section 1, a character attribute database (character attribute DB) 2, legibility control knowledge 3, a legibility control section 4, and a display section 7. The character attribute determination section 1 is a processing section that allows input of a character to be displayed on a screen, acquires a character type (hiragana character, katakana character, alphabet, numeral, or kanji character), the number of strokes thereof, a character density thereof, and so forth from the character attribute database 2, determines a character attribute of the input character, and outputs the resultant to the legibility control section 4. The character attribute database 2 is the database that indicates the character attribute including the character type, the number of strokes, the character density, etc. for each character, and it will be discussed later with reference to FIG. 3. The legibility control knowledge 3 is the control knowledge for defining a blur intensity (degree of blurring) for each character attribute, and the legibility control knowledge 3 will also be discussed later with reference to FIGS. 5 to 8. The legibility control section 4 is the control section that acquires the blur intensity from the legibility control knowledge 3 in accordance with the character attribute determined by the character attribute determination section 1 to thus control the legibility of the character, and includes a blur intensity decision section 5 and a blurring process execution section 6. The blur intensity decision section 5 decides the blur intensity for the character using the legibility control knowledge 3 in accordance with the character attribute determined by the character attribute determination section 1. The blurring process execution section 6 performs a blurring process to the character in accordance with the blur intensity for the character decided by the blur intensity decision section 5. The display section 7 is composed of a display device having a display screen and a display control section therefor, and the legibility control section 4 displays the processed blurred character on the screen.

Next, an operation of the information presentation device in Embodiment 1 will be described.

Figure 2:
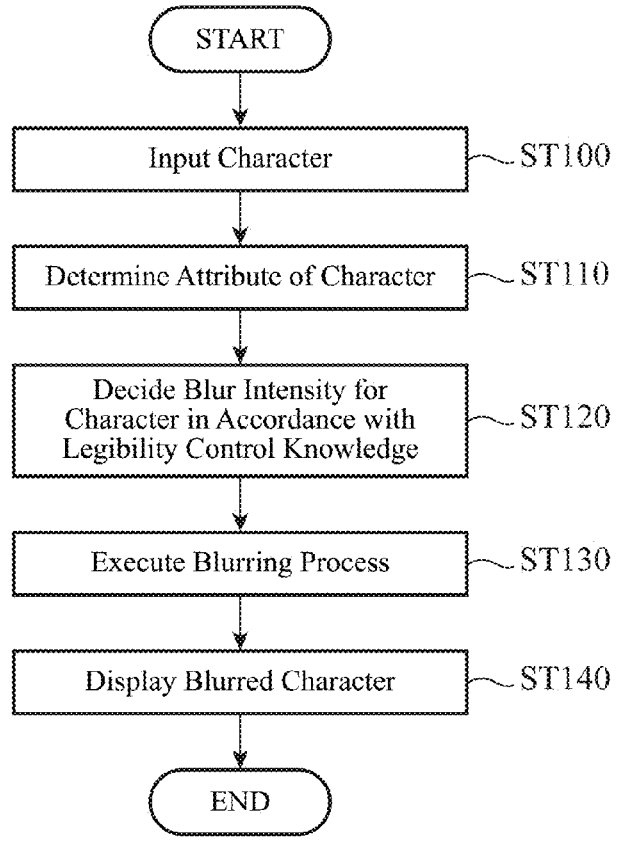
FIG. 2 is a flowchart illustrating an operation in the information presentation device of Embodiment 1 of the invention.

FIG. 2 is a flowchart illustrating the operation of Embodiment 1.

When the character is input to the information presentation device (step ST100), the character attribute determination section 1 refers to the character attribute database 2 in accordance with the input character to thus determine the character attribute of the character, and outputs the character attribute determination result (step ST110). The character attribute database 2 stores the character type, the number of strokes, and a value of the character density as the character attribute for each character as illustrated in FIG. 3, for example. The character type is an attribute that indicates the type of the character such as hiragana character, katakana character, alphabet, numeral, kanji character, and uppercase or lowercase letter of alphabets, while the number of strokes indicates the number of strokes of each character. Also, the character density is the value that indicates a proportion of an area occupied by an actual character portion in an area surrounding the character, and in general, as the number of strokes is larger, the value is higher. Note that the values of the above character attribute shall be prepared in advance. FIG. 4 is an example of the character attribute determination result, illustrating here a case in which "横浜こどもセンターKIDS3" (Yokohama Children Center KIDS3) is provided as a character string.

When the character attribute determination result is output from the character attribute determination section 1, the blur intensity decision section 5 of the legibility control section 4 decides the blur intensity in accordance with the legibility control knowledge 3, and outputs the value that indicates the blur intensity (step ST120). As an example of the legibility control knowledge 3, the blur intensity is decided for the character type, for example, as illustrated in legibility control knowledge 3a in FIG. 5. In addition, as illustrated in legibility control knowledge 3b in FIG. 6, the blur intensity may be decided in accordance with the number of strokes irrespective of the character type. Further, as illustrated in legibility control knowledge 3c in FIG. 7, the blur intensity may be decided in accordance with the character density irrespective of the character type and the number of strokes. This makes it possible to decide the blur intensity for not only text characters but also imaged characters (bitmap characters).

In addition, it may be configured that the legibility control knowledge 3a to 3c illustrated in FIGS. 5 to 7 is used in combination, in which case an order of priority may be given. For example, as illustrated in legibility control knowledge 3d in FIG. 8, the legibility control knowledge 3a illustrated in FIG. 5 and the legibility control knowledge 3b illustrated in FIG. 6 may be combined with each other to decide the blur intensity in consideration of the character type for the hiragana character, katakana character, alphabet, and numeral, and decide the blur intensity in consideration of the number of strokes for only the kanji character. In addition, the blur intensity may be decided in accordance with the number of strokes and the character density for the alphabet and numeral. Further, the blur intensity may be decided in accordance with the uppercase or lowercase etc. for the alphabet. Furthermore, the blur intensity may be decided in accordance with the size of the character. Other than the above, the legibility control knowledge 3 may be any type.

When the blur intensity decision section 5 decides the blur intensity, the blurring process execution section 6 performs the blurring process in accordance with that blur intensity (step ST130). For the blurring process, for example, the blurring process which uses a Gaussian function is used. Additionally, in addition to a blurring filter that uses the Gaussian function, the blurring process may be any type.

When the legibility control section 4 performs the blurring process, the display section 7 displays the blurred character (step ST140).

FIG. 9 is an explanatory diagram illustrating a specific display example.

In FIG. 9, FIG. 9(a) illustrates a state with no blur (normal display): two lines of "ビジネスホテル" (Business Hotel) (character string 1) and "温泉旅館" (Hot Spring Inn) (character string 2) are displayed as an example of the characters. The character string 1 is the character string composed of the katakana characters and having a small number of strokes and a low character density, and the character string 2 is the character string composed of the kanji characters and having a large number of strokes and a high character density. FIG. 9(b) illustrates an example in which the blurring process (blur intensity: weak) is uniformly performed to all the characters, and corresponds to a case in the prior art where the characters are simply blurred, resulting in an uneven blur. In contrast, FIG. 9(c) illustrates a display state in Embodiment 1, and is subjected to the following control: "ビジネスホテル" (character string 1) is strongly blurred (blur intensity: high); and "温泉 旅館" (character string 2) is weakly blurred (blur intensity: low). As a result, it is blurred uniformly to be thereby provided with a sense of uniformity as the blurred characters.

As described above, the information presentation device of Embodiment 1 includes: the character attribute determination section that determines the attribute of the character; legibility control knowledge that defines the blur intensity for each character attribute; the legibility control section that acquires the character attribute of the target character determined by the character attribute determination section and the blur intensity for each character attribute from the legibility control knowledge, and that performs the blurring process with the blur intensity corresponding to the character attribute of the target character; and the display section that displays the character subjected to the blurring process by the legibility control section. Thus, it is possible to make high-quality display thereof with a sense of uniformity, and to enhance safety during operation.

In addition, according to the information presentation device of Embodiment 1, since it is configured that the legibility control knowledge defines the blur intensity that corresponds to the character attribute including at least one of the character type, the number of strokes, the character density, and so forth, it is possible to obtain a fine blur intensity that is suitable for each target character.

Embodiment 2

Embodiment 2 is an example in which a blur control corresponding to the blur intensity is further performed in addition to the blurring process of Embodiment 1.

Figure 10:
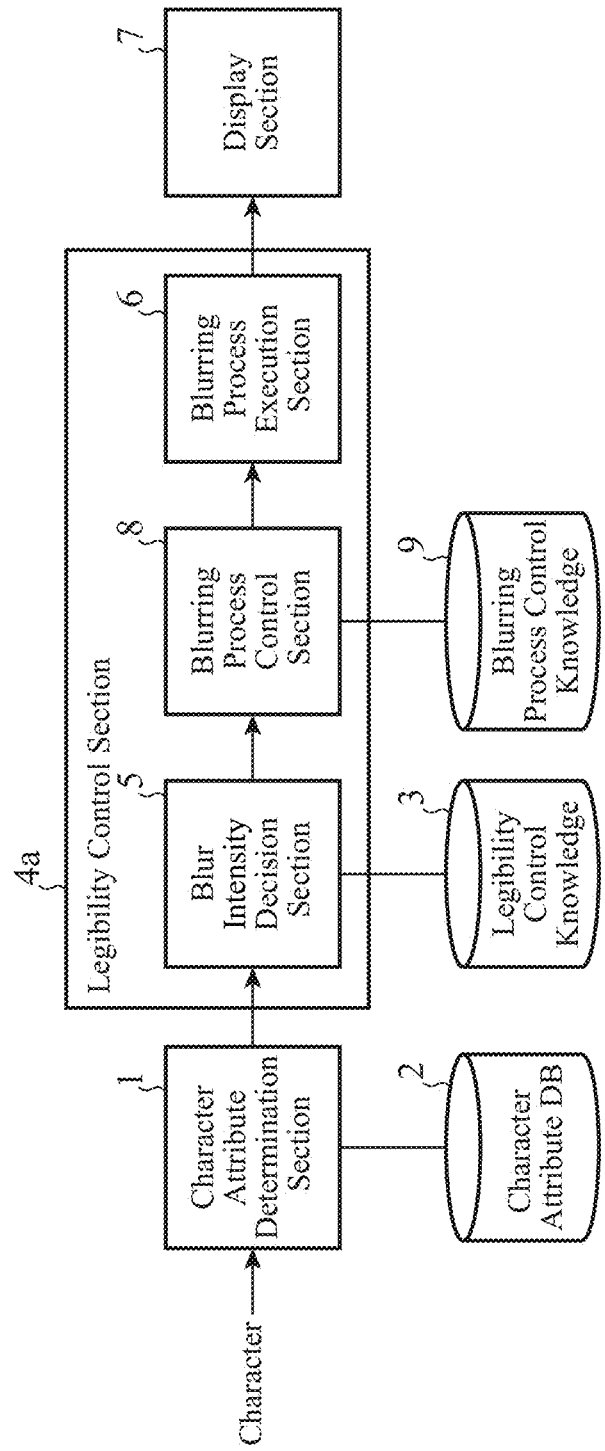
FIG. 10 is a block diagram illustrating an information presentation device of Embodiment 2 of the invention.

FIG. 10 is a block diagram of an information presentation device of Embodiment 2.

The information presentation device of Embodiment 2 includes a character attribute determination section 1, a character attribute database (character attribute DB) 2, legibility control knowledge 3, a legibility control section 4a, a display section 7, a blurring process control section 8, and blurring process control knowledge 9. Since the components other than the blurring process control section 8 and the blurring process control knowledge 9 in the legibility control section 4a are similar to those of Embodiment 1 illustrated in FIG. 1, the corresponding parts are denoted by the same reference numerals, and descriptions thereof will be omitted.

The blurring process control section 8 in the legibility control section 4a is a processing section that refers to the blurring process control knowledge 9 in accordance with a blur intensity decided by the blur intensity decision section 5 to perform a blurring process. The blurring process control knowledge 9 is the control knowledge for performing the blur control corresponding to the blur intensity, and it will be discussed later.

Next, an operation of the information presentation device in Embodiment 2 will be described with reference to a flowchart of FIG. 11.

In the flowchart of FIG. 11, the an operation in steps ST100 to ST120 and step ST140 are similar to those of Embodiment 1 illustrated in the flowchart of FIG. 2. In Embodiment 2, after the blur intensity decision section 5 decides the blur intensity in step ST120, the blurring process control section 8 performs a blur control process using the blurring process control knowledge 9 (step ST200). After that, the blurring process execution section 6 executes the blurring process on the basis of the blur control result output from the blurring process control section 8 (step ST210). For the blurring process control knowledge 9, the following are exemplified: as illustrated in blurring process control knowledge 9a in FIG. 12, a control in which a character is boldfaced in accordance with the blur intensity (the character is more greatly boldfaced as the blur intensity is larger); as illustrated in blurring process control knowledge 9b in FIG. 13, a control in which the number of times of superposition of a blurred character is varied in accordance with the blur intensity (the number of times of superposition is made larger as the blur intensity is higher); and as illustrated in blurring process control knowledge 9c in FIG. 14, a control in which the number of times of superposition with displacement of the blurred character is varied in accordance with the blur intensity (the number of times of superposition is made larger as the blur intensity is higher).

Here, the following control knowledge is shown in the blurring process control knowledge 9a in FIG. 12:

Blur intensity (high): the character is blurred after being greatly boldfaced;
Blur intensity (medium): the character is blurred after being slightly boldfaced; and
Blur intensity (low): the character is blurred without being boldfaced.

That is, a character with a small number of strokes and a character with a low density are thin and faint when blurred. Hence, a strong blur can be expressed when the character is blurred after boldfaced. On the other hand, a character with a large number of strokes and a character with a high density are crushed when these are blurred after boldfaced. Hence, a weak blur can be expressed when the character is blurred without being boldfaced.

This provides a uniform impression to a character string after being blurred.

In addition, the following control knowledge is shown in the blurring process control knowledge 9b in FIG. 13:

Blur intensity (high): the blurred character is displayed as superposed three times;

Blur intensity (medium): the blurred character is displayed as superposed twice; and Blur intensity (low): the blurred character is displayed as it is.

That is, the character with a small number of strokes and the character with a low density are thin and faint when blurred. Hence, the strong blur can be expressed by superposing the blurred character a plurality of times. On the other hand, the character with a large number of strokes and the character with a high density are crushed if superposed over and over after being blurred. Hence, the weak blur can be expressed by not superposing the blurred character.

This provides the uniform impression to the character string after being blurred.

Further, the following control knowledge is shown in the blurring process control knowledge 9c in FIG. 14:

Blur intensity (high): the blurred character is displayed as superposed with displacement three times;

Blur intensity (medium): the blurred character is displayed as superposed with displacement twice; and Blur intensity (low): the blurred character is displayed as it is.

This includes a control that superposes the blurred character with further displacement in addition to the blurring process control knowledge 9b.

This enables to adjust also the thickness of the character in comparison with the blurring process control knowledge 9b. Note that in the blur control using the blurring process control knowledge 9c, a direction to be displaced may be the horizontal direction, the vertical direction, or both of the horizontal and vertical directions.

FIG. 15 is an explanatory diagram illustrating a specific display example in Embodiment 2.

In the drawing, the display example illustrated in FIG. 15(a) is the example using the blurring process control knowledge 9a, corresponding to a control in which characters are blurred uniformly after being boldfaced. Note that character strings without a blur (normal display) are "ビジネスホテル" (character string 1) and "温泉旅館" (character string 2) similar to the example illustrated in FIG. 9(a).

In this case, the blur intensity for the character string "ビジネスホテル" (character string 1) is "high", and therefore the character string is subjected to the blurring process after being boldfaced. On the other hand, the blur intensity for the character string "温泉旅館" (character string 2) is "low", and therefore the character string is subjected to the blurring process as it is. This provides a uniform impression to the character string "ビジネスホテル" (character string 1) and the character string "温泉旅館" (character string 2) after being blurred, which improves the display quality.

In addition, a display example illustrated in FIG. 15(b) is the example using the blurring process control knowledge 9b, in which blurred characters are displayed as superposed a plurality of times. For example, the blur intensity for the character string "ビジネスホテル" (character string 1) is "high", and therefore the character string is superposed three times before being displayed. On the other hand, the blur intensity for the character string "温泉旅館" (character string 2) is "low", and therefore the blurred characters are superposed once, that is, the blurred characters are displayed as they are. This provides a uniform impression to the character string "ビジネスホテル" (character string 1) and the character string "温泉旅館" (character string 2) after being blurred, which improves the display quality.

FIG. 16 is an explanatory diagram illustrating the relationship between the character attribute and the blur intensity in Embodiment 1 and the relationship between the blur intensity and the bold-facing level in Embodiment 2. The drawing illustrates the relationship between the number of strokes and the blur intensity in FIG. 6 and the relationship between the blur intensity and the bold-facing level in FIG. 12 in combination. As illustrated in FIG. 16, the bold-facing level is decided in accordance with the character attribute. Moreover, in addition to the example illustrated in FIG. 16, the blur intensity corresponding to the character attribute illustrated in FIGS. 5 to 8 and the blur control corresponding to the blur intensity illustrated in FIGS. 12 to 14 can be combined with each other optionally to thus obtain a blurred result.

As described above, according to the information presentation device of Embodiment 2, it is configured to include the blurring process control knowledge for defining the blurring process corresponding to the blur intensity, such that the legibility control section performs the blur control process corresponding to the blur intensity using the blurring process control knowledge. Thus, it is possible to provide a sense of uniformity for the display of blurred characters to obtain further high-quality display in addition to the effect of Embodiment 1.

In Embodiment 2, it is configured that the blurring process control knowledge for defining the blurring process corresponding to the character attributes is provided, and that the legibility control section performs the control process corresponding to the character attribute using the blurring process control knowledge. Thus, it is possible to provide a sense of uniformity for the display of the blurred characters to obtain further high-quality display in addition to the effect of Embodiment 1.

Additionally, in Embodiments 1 and 2 described above, the characters to be blurred may be all the characters on the screen. For example, any characters on the screen such as characters on a button, characters in a list, screen title characters, and information display characters may be the characters to be blurred.

Figure 17:
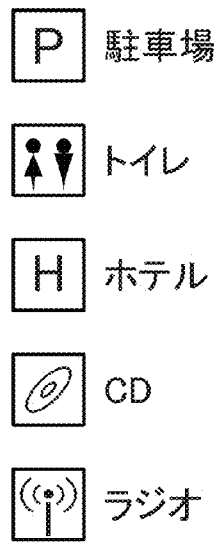
FIG. 17 is an explanatory diagram illustrating an example of characters with a symbol in the information presentation devices of Embodiments 1 and 2 of the invention.

In addition, for texts with a symbol and texts with an icon, only characters may be blurred with the symbol and the icon displayed as they are. For example, for character strings such as "駐車場" and "トイレ" with a symbol (pictogram) illustrated in FIG. 17, only the character strings are blurred, and the pictograms are displayed as they are. Alternatively, the following process may be performed: the character strings including the symbol are blurred.

Embodiment 3

Embodiment 3 is an example in which the information presentation device is mounted as an in-vehicle information apparatus.

Figure 18:
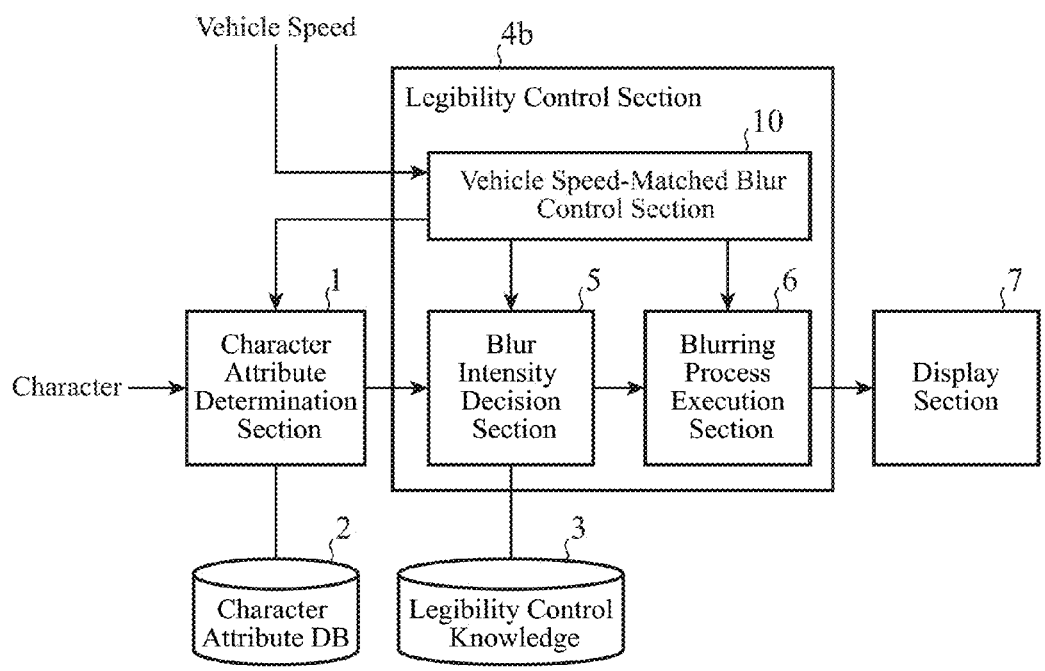
FIG. 18 is a block diagram illustrating an information presentation device of Embodiment 3 of the invention.

FIG. 18 is a block diagram illustrating an information presentation device of Embodiment 3.

The information presentation device of Embodiment 3 includes a character attribute determination section 1, a character attribute database (character attribute DB) 2, legibility control knowledge 3, a legibility control section 4b, a display section 7. Here, the components other than those in the legibility control section 4b are similar to those of Embodiment 1 illustrated in FIG. 1, and therefore descriptions of the components other than the legibility control section 4b will be omitted.

The legibility control section 4b of Embodiment 3 includes the legibility control knowledge 3, the blur intensity decision section 5, and the blurring process execution section 6, and further includes a vehicle speed-matched blur control section 10. The vehicle speed-matched blur control section 10 is the control section that controls the character attribute determination section 1, the blur intensity decision section 5, and the blurring process execution section 6 in correspondence with an input vehicle speed. That is, the vehicle speed-matched blur control section 10 controls the character attribute determination section 1, the blur intensity decision section 5, and the blurring process execution section 6 so as to perform a blurring process only during travel of a vehicle, and so as not to perform the blurring process during stop thereof.

Next, an operation of the information presentation device in Embodiment 3 will be described with reference to a flowchart of FIG. 19.

Figure 19:
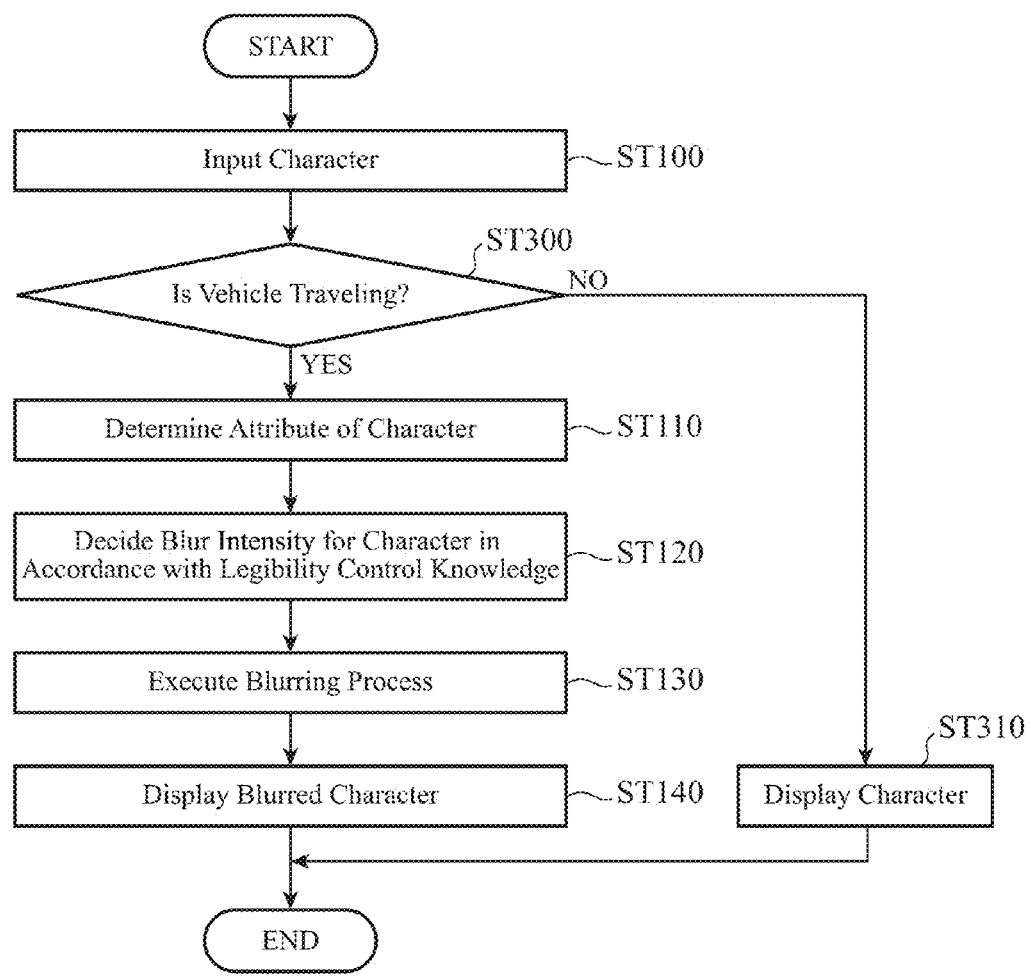
FIG. 19 is a flowchart illustrating an operation in the information presentation device of Embodiment 3 of the invention.

In the flowchart of FIG. 19, the operation in steps ST100 to ST140 are similar to those of Embodiment 1 illustrated in the flowchart of FIG. 2. In Embodiment 3, in the case where a character input is performed in step ST100, the vehicle speed-matched blur control section 10 of the legibility control section 4b determines whether or not the vehicle is traveling in accordance with the input vehicle speed (step ST300). Here, in the case where it is determined that the vehicle is not traveling, the blurring process is not performed, and a character display is performed as it is (step ST310). That is, the vehicle speed-matched blur control section 10 instructs the character attribute determination section 1, the blur intensity decision section 5, and the blurring process execution section 6 to perform the character display as it is without performing of the blurring process. On the other hand, in the case where it is determined in step ST300 that the vehicle is traveling, the vehicle speed-matched blur control section 10 instructs the character attribute determination section 1, the blur intensity decision section 5, and the blurring process execution section 6 to perform the blurring process to thereby perform the processes in steps ST110 to ST140.

In this way, in Embodiment 3, when an operation restriction during travel is carried out, displaying blurred characters can demonstrate application of the travel operation restriction without collapsing a screen design. In addition, since the characters are blurred to be illegible, attention is not directed to the reading more than necessary, which can improve safety. It is also possible to obtain a higher display quality in comparison with conventional configurations such that the characters are hidden, the contrast of the characters is reduced, the characters are replaced with another symbol and so on.

In addition, in Embodiment 3, the blurred ones are illegible as the characters, but can be recognized as to what characters they are based on the shape and the number of characters, and therefore, a user can actually feel that he/she is performing an operation. That is, the user who is accustomed to the operation during stop can imagine the content of the blurred characters, namely what character string the blurred ones is, based on the shapes and the number of characters of the blurred ones. Then, the user can perform the operation even during travel relying on this imagination. That is, in such a case, this is because: the user is considered to be familiar with the operation, and therefore it is considered that there is little significant reduction in safety due to performing of the operation.

On the other hand, the user who is not accustomed to the operation cannot determine what is indicated due to the blurred characters, resulting in giving up the operating act; consequently, the situation can be prevented that viewing closely the display screen neglects a drive operation.

In this way, the information presentation device of the embodiment can provide a safe operation method that matches the skill of the user.

Meanwhile, in the case where the display screen is related to a list operation, in particular, the list is composed of the blurred characters, which can obtain an operation feeling even in cursor operation, list scrolling, and so on. Then, in the case where an item indicated by a cursor is read aloud by audio guidance, the cursor can be moved in anticipation of the content of character strings, and therefore, a targeted item can be selected more quickly and efficiently than a configuration in which the characters are hidden.

In the example described above, though the vehicle speed-matched blur control section 10 performs the two-step control during stop and during travel on the basis of the vehicle speed, it may perform further stepwise the control during travel in accordance with the vehicle speed. For example, the vehicle speed-matched blur control section 10 displays all the characters during stop as in the example described above, and varies the range of the characters to be blurred between a case where the vehicle speed is equal to or less than a threshold (when the vehicle is traveling slowly) and a case where the vehicle speed is beyond the threshold (during normal travel) for the control during travel.

Figure 20:
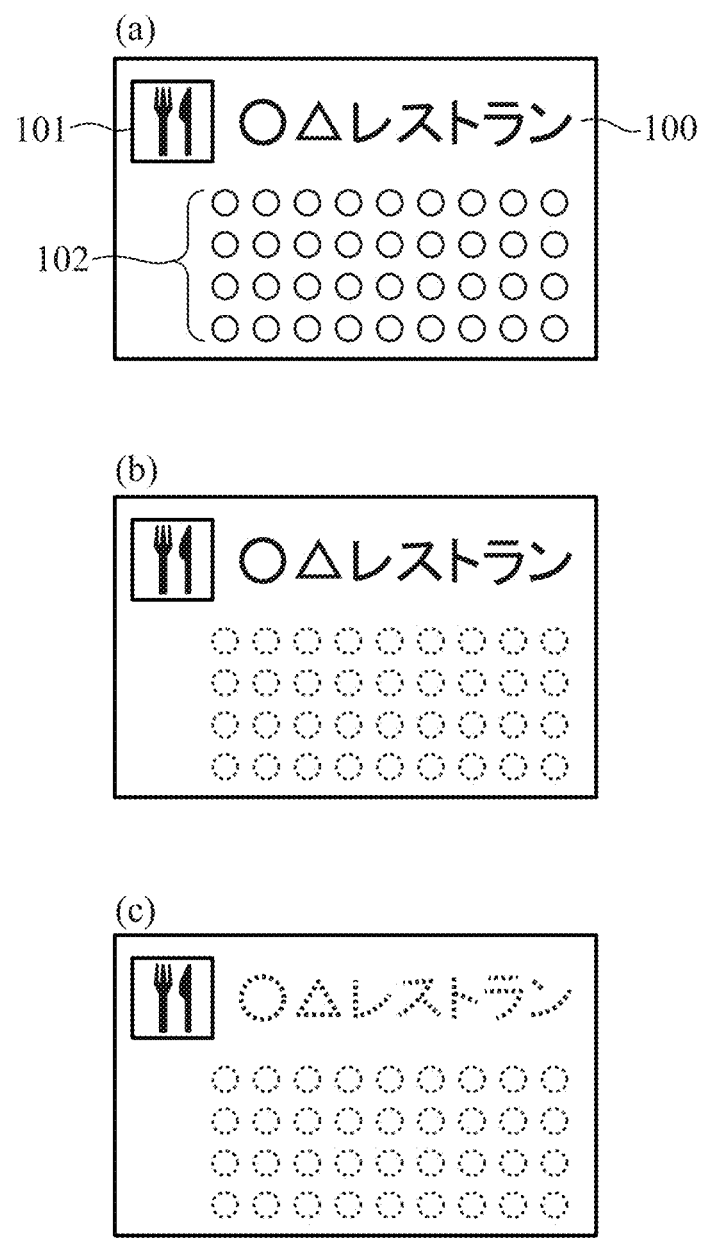
FIG. 20 is an explanatory diagram illustrating a vehicle speed-matched blurring process in the information presentation device of Embodiment 3 of the invention.

FIG. 20 is an explanatory diagram illustrating the above-described vehicle speed-matched blur control.

In the drawing, FIG. 20(a) illustrates a state during stop, and all of a restaurant name 100, a restaurant symbol 101, and detailed information 102 are displayed. FIG. 20(b) illustrates a case where a vehicle speed A satisfies 0<A≤T1 (T1 is a constant that is more than 0), and the blurring process described above is performed to the detailed information 102. FIG. 20(c) illustrates a case where the vehicle speed is more than T1, and the blurring process is performed to the restaurant name 100 and the detailed information 102, and only the restaurant symbol 101 is normally displayed (without the blurring process).

With the above configuration, a suitable display state can be established in accordance with the travel state of the vehicle.

Additionally, in the example described above, there is described the case in which the information presentation device of Embodiment 1 is applied as the in-vehicle information presentation device. However, the information presentation device of Embodiment 2 may be applied as the in-vehicle information presentation device. In this case, the vehicle speed-matched blur control section 10 further includes the blurring process control section 8 to control the blurring process that matches the vehicle speed.

As described above, according to the information presentation device of Embodiment 3, since it is configured that the legibility control section performs the blurring process only during travel of the vehicle, and does not perform the blurring process during stop, the information presentation device can contribute to improvement in safety and improvement in operability as the in-vehicle information presentation device.

In addition, according to the information presentation device of Embodiment 3, the legibility control section is configured to increase the number of characters to be subjected to the blurring process as the traveling speed of the vehicle is higher, and thus, the display suitable for the traveling state can be achieved.

Additionally, in Embodiments 1 to 3 described above, the blurred characters and audible reading may be combined with each other. For example, the character string for a certain button is displayed using the blurred characters, and the audible reading is performed corresponding to the button in the case where the button is operated. This allows the user to operate the button while estimating (guessing) the function of the button from the blurred characters, and to perform a decision operation with confidence obtained through the audible reading.

Meanwhile, in the case of a remote control operation (a joystick, a rotary dial, etc.), the name of the button or the name of the list may be read aloud when the cursor selects the button or list. This makes it possible to perform the decision operation after confirming the name of the button or the name of the list by speech, thereby performing more reliably the operation without anxiety.

Further, in the case of a touch panel operation, the name of the button may be read aloud when the button is touched by a finger. This makes it possible to perform the decision operation (for example, press the button with the finger) after confirming the name of the button by speech, thereby performing more reliably the operation without anxiety. Note that this applies to the touch panel that allows separate an operation for selection and decision.

In addition, the blurred characters and unblurred characters may be used in a mixed manner on the display screen. For example, there are normally only a limited number of buttons with a fixed button name on the display screen, and therefore displaying all such buttons does not significantly burden the user in the drive operation. Hence, the characters for the button with a fixed button name (the button is integrated with a character string) are displayed without being blurred. Meanwhile, in the list to be scrolled or having variable contents depending on situations, in particular, extending several tens of lines (list items), performing the scrolling operation and so on during driving may impair safety. Hence, the characters for the "list items" are displayed in a blurred manner.

Further, the blurred characters and unblurred characters may be used in a mixed manner in accordance with the priority of the information. For example, the characters with a high priority are displayed, and the characters with a low priority are displayed in a blurred manner. Here, the value of the priority corresponds to difference in emergency or difference in importance. For example, the following control may be performed: the characters with a high emergency related to the next intersection may be displayed as they are, and the other characters with a low emergency may be blurred.

In Embodiments 1 to 3 described above, Japanese characters (including alphabets and numerals) are used as the characters to be blurred. However, the characters to be blurred may be any characters such as Chinese characters, Korean characters, English characters, French characters, German characters, and Arabic characters, in addition to Japanese characters. That is, the present invention may be applied to any language by modifying the content of the character attribute database 2, the legibility control knowledge 3, and the blurring process control knowledge 9 in accordance with the language for application.

The present invention may be subjected to a free combination of the embodiments, deformation of a desired component of each embodiment, or omission of a desired component of each embodiment within the scope of the invention.

INDUSTRIAL APPLICABILITY

As described above, the information presentation device of the present invention displays characters in a blurring manner in accordance with the attribute of the characters, and is suitable for use as an in-vehicle device such as a navigation system for a vehicle.

DESCRIPTION OF REFERENCE NUMERALS AND SIGNS

1: character attribute determination section
2: character attribute database
3, 3a to 3d: legibility control knowledge
4, 4a, 4b: legibility control section
5: blur intensity decision section
6: blurring process execution section
7: display section
8: blurring process control section
9, 9a, 9b, 9c: blurring process control knowledge
10: vehicle speed-matched blur control section.

The invention claimed is:

1. An information presentation device comprising:
a legibility controller that performs a blurring process to a character to be displayed on a display, wherein the legibility controller varies a blur intensity for the character in accordance with an attribute of the character,
wherein the legibility controller performs the blurring process with the blur intensity which corresponds to the attribute of the character including at least one of the number of strokes, a character density, uppercase or lowercase, and a size of the character.

2. The information presentation device according to claim 1, further comprising:
a blurring process control table that defines the blurring process that corresponds to the blur intensity or the character attribute, wherein the legibility controller performs a blur control process corresponding to the blur intensity or the character attribute using the blurring process control knowledge.

3. The information presentation device according to claim 1, wherein the legibility controller performs the blurring process only during travel of a vehicle, and does not perform the blurring process during stop of the vehicle.

4. The information presentation device according to claim 3, wherein the legibility controller increases the number of characters to be subjected to the blurring process as a traveling speed of the vehicle is higher.

5. The information presentation device according to claim 1, wherein the blurring process applies a Gaussian function.

6. An information presentation device comprising:
a character attribute determinator that determines an attribute of a character;
a legibility control table that defines a blur intensity for each character attribute;
a legibility controller that acquires the character attribute of the target character determined by the character attribute determinator and the blur intensity for each character attribute from the legibility control knowledge, and that performs a blurring process with the blur intensity corresponding to the character attribute of the target character; and a display that displays the character subjected to the blurring process by the legibility controller, wherein the legibility controller performs the blurring process with the blur intensity which corresponds to the attribute of the character including at least one of the number of strokes, a character density, uppercase or lowercase, and a size of the character.

* * * * *